US006948707B2

(12) United States Patent
Gradu

(10) Patent No.: US 6,948,707 B2
(45) Date of Patent: Sep. 27, 2005

(54) STABILIZER BAR HAVING VARIABLE TORSIONAL STIFFNESS

(75) Inventor: Mircea Gradu, Wooster, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/731,662

(22) Filed: Dec. 9, 2003

(65) Prior Publication Data

US 2005/0121841 A1    Jun. 9, 2005

(51) Int. Cl.$^7$ ...................... B60G 15/00; B60G 21/055
(52) U.S. Cl. ...................... 267/191; 267/188; 267/277; 280/124.107
(58) Field of Search .................. 267/183, 188, 267/191, 273, 277, 187, 186; 280/124.106, 280/124.162, 124.164, 124.166, 124.107

(56) References Cited

U.S. PATENT DOCUMENTS

| | | | |
|---|---|---|---|
| 5,129,273 A * | 7/1992 | Fukui et al. ............... | 74/89.35 |
| 5,826,687 A | 10/1998 | Büngeler et al. | |
| 5,845,753 A | 12/1998 | Bansbach | |
| 6,022,030 A * | 2/2000 | Fehring ............... | 280/124.106 |
| 6,149,166 A * | 11/2000 | Struss et al. .......... | 280/124.106 |
| 6,241,067 B1 | 6/2001 | Höck | |
| 6,318,737 B1 * | 11/2001 | Marechal et al. ..... | 280/124.106 |
| 6,428,019 B1 | 8/2002 | Kincad et al. | |
| 6,481,732 B1 * | 11/2002 | Hawkins et al. ...... | 280/124.106 |
| 6,507,778 B2 | 1/2003 | Koh | |
| 6,513,819 B1 * | 2/2003 | Oliver et al. ......... | 280/124.106 |
| 6,637,757 B2 * | 10/2003 | Ignatius et al. ....... | 280/124.106 |
| 2004/0217568 A1 * | 11/2004 | Gradu ................. | 280/124.107 |
| 2004/0217569 A1 * | 11/2004 | Gradu et al. .......... | 280/124.107 |

FOREIGN PATENT DOCUMENTS

| | | | | |
|---|---|---|---|---|
| DE | 4443809 A1 | 4/1996 | | |
| EP | 428439 A1 * | 5/1991 | .......... | 280/124.106 |
| EP | 1321321 A2 | 6/2003 | | |
| GB | 2230237 A | 10/1990 | | |
| GB | 2275661 A | 2/1994 | | |

OTHER PUBLICATIONS

Brochure, DELPHI Energy & Chassis Systems, 2002, "Dynamic Body Control System".
Brochure, SAE International, Aleksander Hac, Mar. 2002, "Influence of Active Chassis Systems on Vehicle Propensity to Maneuver-Induced Rollovers".

* cited by examiner

Primary Examiner—Thomas Williams
(74) Attorney, Agent, or Firm—Polster, Lieder, Woodruff & Lucchesi, L.C.

(57) ABSTRACT

A stabilizer bar (D) for controlling the roll of an automotive vehicle has left and right sections (16, 18) joined together at a coupling (20) including a housing (36) on one of the sections and on a rotor (38) on the other section, with the rotor being in the housing. The coupling also includes a piston (40) which displaces axially in the housing in response to relative rotation between the sections, and this varies the volume in a housing cavity (80) behind it. That cavity is connected to a valve (22) having a restrictor (98) that carries an electrical coil (104). Both the valve and housing cavity contain a rheological fluid (82). The cease with which the piston displaces in the housing controls the stiffness of bar, and that depends on the viscosity of the fluid in the valve. The magnetic field produced by the coil controls the viscosity of the fluid.

14 Claims, 2 Drawing Sheets

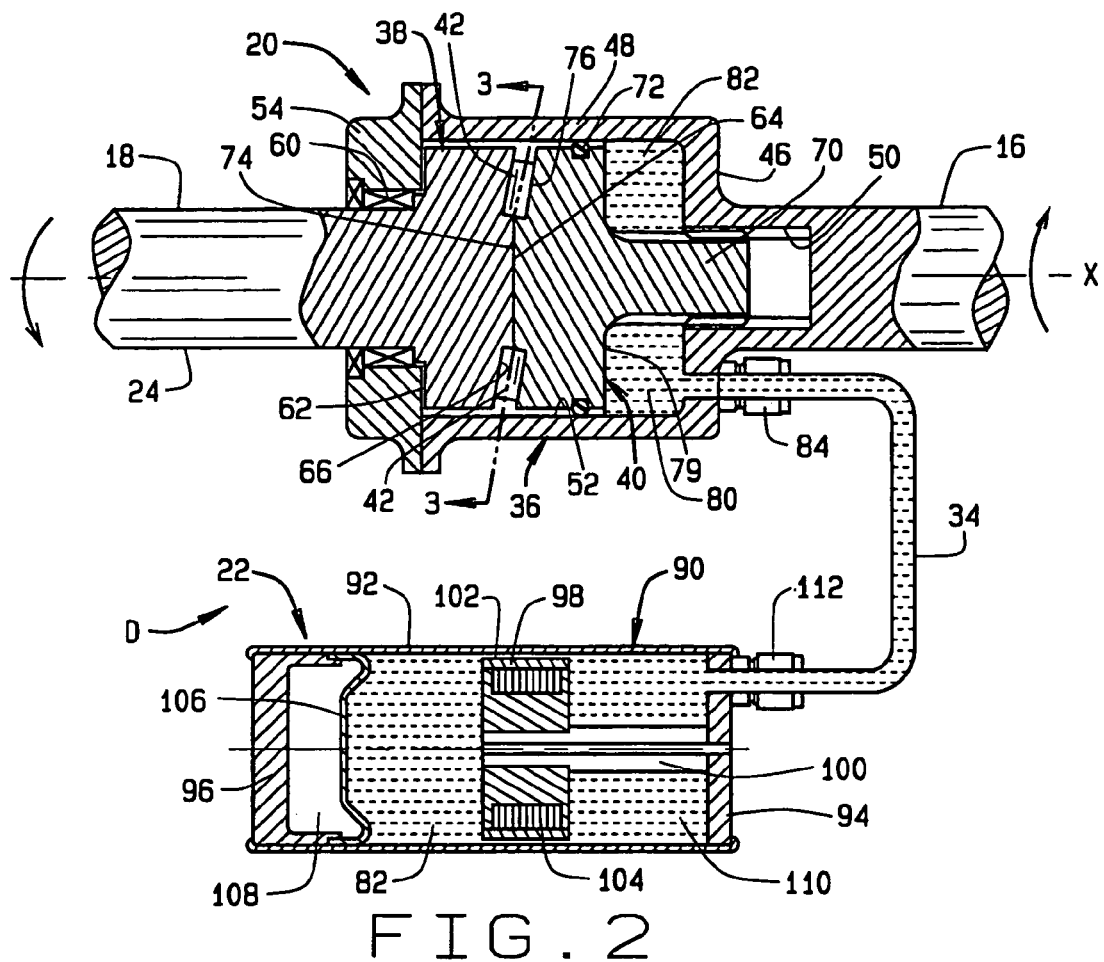
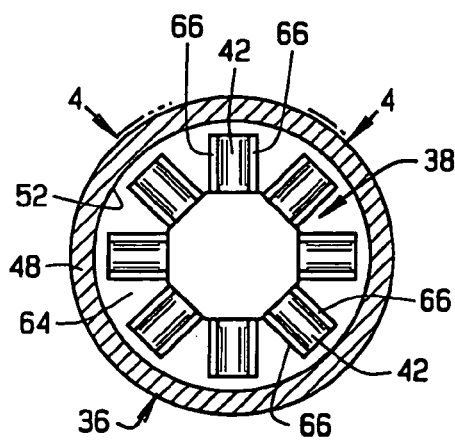
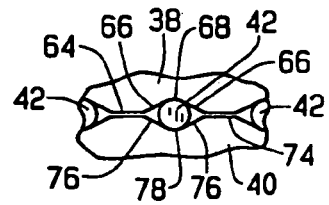

STABILIZER BAR HAVING VARIABLE TORSIONAL STIFFNESS

CROSS REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

This invention relates to suspension systems for automotive vehicles and more particularly to a stabilizer bar for a suspension system.

The typical passenger automobile has independently suspended front wheels, as do similar vehicles, such as sports utility vehicles, vans, and light trucks. In order to prevent excessive body roll in such vehicles when they negotiate turns, particularly at higher speeds, the vehicles are equipped with stabilizer bars that connect the sides of their front suspensions. Each side on such a vehicle includes at least one control arm and a steering knuckle to which a wheel end is attached, with one of the front wheels being mounted on the wheel end. The stabilizer bar constitutes nothing more than a torsion bar that extends transversely across the front of the vehicle where it is attached to the frame or body of the vehicle, yet is free to rotate. At its ends, the stabilizer bar has torque arms which are attached to the control arms. As a consequence, the control arms tend to move in unison in the same direction and transfer forces to the frame—forces which modulate and retard roll.

While a stabilizer bar will improve the control and orientation of a vehicle when the vehicle negotiates a turn, particularly at high speeds on paved surfaces, it detracts from the ride when the vehicle travels along straight road surfaces. Moreover, it makes travel at low speeds, either straight or through turns, more uncomfortable than it could otherwise be. After all, when one wheel is deflected upwardly, such as by encountering a bump, the other wheel will attempt to lift as well, since the stabilizer bar connects the control arms for both wheels, and oppositely directed forces are applied to the vehicle frame. This can produce a rocking motion when the vehicle travels off road or over uneven road surfaces—a phenomenon sometimes referred to as "antiroll bar waddle". Hence, different driving conditions call for stabilizer bars with different torsional stiffness. At one extreme are the conditions encountered off road and on secondary roads traveled at relatively low speeds and also those encountered on straight segments of paved roads. These conditions require low torsional stiffness. At the other extreme are the conditions encountered when negotiating turns on paved surfaces at high speeds. These conditions require high stiffness. Most stabilizer bars have high stiffness to resist roll and maintain control in turns.

BRIEF DESCRIPTION OF THE SEVERAL VIEWS OF THE DRAWINGS

FIG. 2 is a longitudinal elevational view, partially broken away and in section of the coupling and valve for the stabilizer bar;

FIG. 3 is a sectional view taken along line 3—3 of FIG. 2; and

FIG. 4 is a fragmentary sectional view taken along line 4—4 of FIG. 3.

Corresponding reference characters indicate corresponding parts throughout the several views of the drawings.

DETAILED DESCRIPTION OF INVENTION

Figure 1:
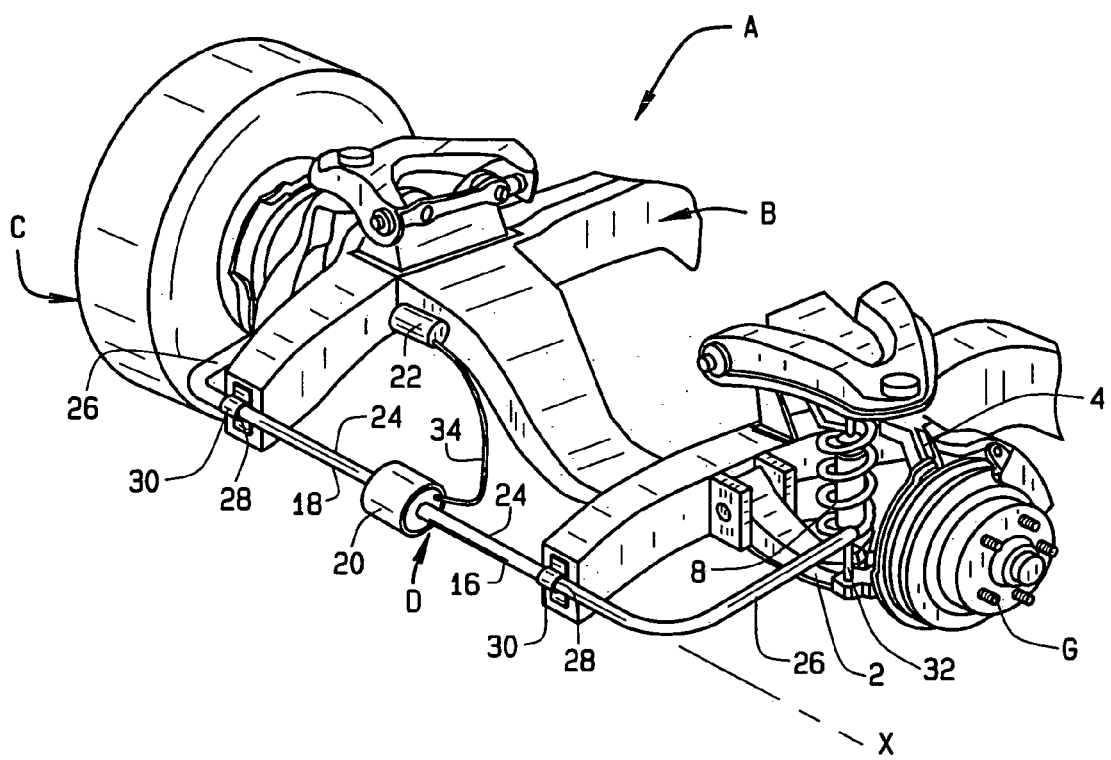
FIG. 1 is a perspective view of a suspension system provided with the stabilizer bar of the present invention.

Referring now to the drawings, an automotive vehicle has a suspension system A (FIG. 1) that is attached to a rigid structural component B, such as a frame or a unified body, of the vehicle. The suspension system A couples left and right road wheels C to the structural component B such that the road wheels C can displace vertically with respect to the structural component B. The suspension system A includes a stabilizer bar D which is attached to both sides of the structural component B and, in effect connects the left and right wheels C. The arrangement is such that when the body of the vehicle rolls—and with it the structural member B—the stabilizer bar D, being extended between the two wheels C, resists the tendency to roll, assuming of course, that it possesses a good measure of torsional stiffness. But when one of the wheels C is displaced vertically, the bar D may transmit a force to the opposite wheel C and that force will urge the opposite wheel C in the same direction as the displacement if the bar D possesses the same torsional stiffness. Actually, the torsional stiffness of the bar D can be varied to accommodate differing road and driving conditions.

Considering the suspension system A in more detail, it may be a double wishbone or McPherson strut suspension. Either one, on each side of the vehicle, includes (FIG. 1) control arm 2 that is attached to the structural component B such that it can pivot about an axis that extends generally longitudinally with respect to the vehicle. The control arm 2 extends laterally from that pivot axis, and at its outboard end is fitted with suspension upright 4, the two being coupled together such that they can pivot relative to each other. When the suspension upright 4 steers the vehicle, it takes the form of a steering knuckle that is coupled to the control arm 2 through a universal pivot, such as a ball-and-socket joint. In any event, the suspension upright 4 supports a wheel end 6 to which one of the road wheel C is attached. The typical wheel end 6 has a housing that is attached to the upright 4, a hub to which the road wheel C is secured, and a bearing between the hub and housing to enable the hub and wheel C to rotate on the suspension upright 4 with minimal friction. Finally the suspension system A at each side of the vehicle, has a spring 8 or torsion bar which is extended between the control arm 2 and the structural component B to support the vehicle on the wheel C toward which the control arm 2 extends.

The stabilizer bar D includes (FIG. 1) left and right sections 16 and 18 and a coupling 20 located between the sections 16 and 18, and also a valve 22 connected to the coupling 20. Each section 16 and 18, in turn, includes a torsion rod 24 and a torque arm 26. The torsion rods 24 extend transversely on the vehicle and lie along a common transverse axis X. Each is encircled by a bushing 28 over which a clamping bracket 30 fits. The brackets 30 are, in turn, attached firmly to the structural component B to thus secure the stabilizer bar D to the component B. Even so, the torsion rods 24 can rotate within their respective bushings 28. The torque arms 26 extend from the outboard ends of the torsion rods 24 at a substantial angle with respect to the axis X and lie generally longitudinally in the vehicle. At their ends remote from the torsion rods 24 they are connected to the control arms 2 through vertical links 32—the torque arm 26 of the left section 16 being connected to the left control arm 2 through one link 32 and the torque arm 26 of the right section 16 being connected to the right control arm 2 through another link 32.

The coupling 20 together with the valve 22 controls the torsional stiffness of the stabilizer bar D. Whereas the coupling 20 is located between the left section 16 and the right section 18, the valve 22 may be located remote from those sections 16 and 18, perhaps on the structural component B. The two are connected through a flexible fluid line 34.

Considering the coupling 20 first, it has several coupling members including (FIG. 2) a housing 36, a rotor 38 which rotates relative to the housing 36, and a piston 40 which is also located within the housing 36 where it moves axially, but not rotationally, with respect to the housing 36. In addition, the coupling 20 has rolling elements in the form of generally cylindrical rollers 42 located between the rotor 38 and the piston 40. The housing 36 is attached rigidly to the left section 16 at the end remote from the link 32 for that section, while the rotor 38 is attached rigidly to the right section 18. Thus, the coupling 20 resides between the two clamping brackets 30 where the stabilizer bar D is attached to the structural component B. The coupling 20 enables the two sections 16 and 18 to rotate relative to each other, although through an arc of generally no more than about 20°, and also is capable of locking the two sections 16 and 18 together.

The housing 36 includes (FIG. 2) an end wall 46, which is attached firmly to the torsion rod 24 of the left section 16, and an axial wall 48, which extends from end wall 46 and encloses both the rotor 38 and piston 40. The end wall 46 contains a splined socket 50 which has its center along the axis X and opens into the volume enclosed by the axial wall 48. The axial wall 48 has a smooth interior surface 52 of cylindrical shape, its center also being along the axis X. The housing 36 also includes an end cap 54 which is attached firmly to the axial wall 48 at the end opposite from the end wall 46.

The rotor 38 is joined rigidly to the torsion rod 24 of the right section 18 and fits within the housing 36 where it may rotate in a limited arc immediately behind the end cap 54. The torsion rod 24 for the right section 18 fits within a bearing 60 carried by the end cap 54 to enable that rod 24 and the rotor 38 to rotate in the housing 36. The rotor 38 has a back face 62 which bears against the inside face of the end cap 54 to thereby fix the axial position of the rotor 38 within the housing 36. At its opposite end the rotor 38 has a front face 64 provided with ramps 66 which are arranged in pairs (FIGS. 3 & 4), with the ramps 66 of each pair descending into a valley 68 located between those ramps 66. The pairs of ramps 66 and the valleys 68 between them are arranged at equal circumferential intervals around the axis X.

The piston 40 likewise fits within the housing 36 and is provided with (FIG. 2) a splined stub shaft 70 which projects into the splined socket 50 of the housing 36. Indeed, the spline on the stub shaft 70 engages the spline of the socket 50 so that the piston 40 cannot rotate in the housing 36, yet can shift axially in it. Along its periphery the piston 40 has a seal 72, such as an elastomeric O-ring, which wipes the cylindrical interior surface 52 on the axial wall 48 of the housing 36 as the piston 40 shifts axially to and fro in the housing 36. The piston 40 has a front face 74 which is presented toward the front face 64 of the rotor 38, and like the rotor front face 64, it has (FIGS. 3 & 4) ramps 76 arranged in pairs, with the ramps 76 of each pair descending into a valley 78. In number, the pairs of ramps 76 and valleys 78 equal their counterparts in the face 64 of the rotor 38. Moreover, the circumferential spacing is the same. When the valleys 78 of the piston 40 align with the valleys 68 of the rotor 38, the torsion arms 26 for the two sections lie at the same angle with respect to the coupling 20. The piston 40 also has a back face 79 which is presented toward, yet is spaced from, the end wall 46 of the housing 36, thus forming a cavity 80 in the housing 36. The cavity 80 contains a magneto-rheological fluid 82 which further fills the flexible line 34 and the valve 22. The end wall 46 of the housing 36 is fitted with a port 84 opens into the cavity 80, and the flexible fluid line 34 connects to the coupling 20 at the port 84.

The rollers 42 of the coupling 20 reside between the ramps 66 on the rotor 38 and the ramps 76 on the piston 40 (FIGS. 2 & 4), there being a single roller 42 between each pair of ramps 66 on the rotor 38 and the corresponding ramps 76 on the piston 40. When the piston 40 is farthest from the end wall 46 of the housing 36 and the cavity 80 has its greatest volume, the rollers 42 lie in a centered position (FIGS. 2–4) within the valleys 68 and 78. However, when the rotor 38 rotates, the rollers 42 roll along the ramps 66 and 76 on the rotor 38 and piston 40, respectively. This forces the piston 40 away from the rotor 38 and decreases the size of the cavity 80. Movement in the opposite direction of rotation back to the centered position allows the cavity 80 to expand back to its maximum volume. Of course, rotation in either direction away from the centered position causes the cavity 80 to decrease in volume which results in a displacement of fluid 82 from the cavity 80. It flows outwardly into the line 34.

The valve 22, which is located remote from the coupling 20, has (FIG. 2) a housing 90 including a cylindrical wall 92 and end walls 94 and 96 at the ends of the cylindrical wall 92, there being fluid-tight seals between the end walls 94 and 96 and the cylindrical wall 92. In addition, the valve 22 has a restrictor 98 located within its housing 90 between the two end walls 94 and 96, it being supported there in a fixed position by a support rod 100 which extends from the wall 94. The restrictor 98 has a cylindrical peripheral surface 102 which is set slightly inwardly from the interior surface of the cylindrical wall 92 on the housing 90, so that an annular gap exists between the restrictor 98 and the housing 90. The restrictor 98 contains an electrical coil 104 which, when energized, produces a magnetic flux that passes through the housing 90.

The end wall 96 carries a flexible diaphragm 106 which lies between it and the restrictor 98. The diaphragm 106 divides the interior of the housing 90 into two chambers—one a small accumulator chamber 108 and the other a larger rheological chamber 110. The accumulator chamber 108 contains a pressurized gas, such as nitrogen. The larger rheological chamber 110, which is occupied in part by the restrictor 98, contains the magneto-rheological fluid 82. To this end, the end wall 94 has a port 112 which is connected to the other end of the flexible fluid line 34.

The coil 104 of the valve 22 is connected to a source of electrical energy through a control device which controls the potential impressed across the coil 104 and the current flowing through it. Normally, the magneto-rheological fluid 82 flows quite freely, that is to say, it has a low viscosity. Hence, it will flow through the gap between the cylindrical wall 92 of the valve housing 90 and the peripheral surface 102 of the restrictor 98 with relative ease. However, when the coil 104 is energized it produces a magnetic flux which passes through the large rheological chamber 110 at each end of the restrictor 98 and also through the gap between the restrictor 98 and the cylindrical wall 92 of the valve housing 90. In the presence of the magnetic flux the fluid 82 acquires a greater viscosity and thus flows less freely through the gap—and less freely out of the cavity 80 in the coupling 20 as well.

Under some driving conditions, it is best to have the left and right sections 16 and 18 of the stabilizer bar D operate somewhat independently of each other, so that very little torque transfers between them at the coupling 20. Such conditions require low torsional stiffness in the bar D. On the other hand, other driving conditions require a good measure of stiffness in the bar D, so that torque exerted on the section 16 transfers to the section 18 or vice versa. The valve 22, and particularly the coil 104 in the valve 22, controls the stiffness of the bar D.

As torque is applied to the stabilizer bar D the rotor 38 seeks to rotate relative to the housing 36 and piston 40. if it does, the rollers, 42 will move out of the valleys 68 and 78 and ride up opposed ramps 66 and 76 on the rotor 38 and piston 40, respectively. This drives the piston 40 away from the rotor 38 and decreases the volume of the cavity 80 in the coupling 20. Some of the magneto-rheological fluid 82 in the cavity 80 is displaced, thus forcing more fluid into the rheological chamber 110 of the valve 22. The diaphragm 106 flexes to accommodate the additional fluid 82. However, in order to displace the diaphragm 106 some of the fluid 92 in the chamber 110 must flow through the gap between the restrictor 100 and the cylindrical wall 92 of the valve housing 90. The ease with which the fluid 82 flows through the gap depends on the viscosity of the fluid 82 in the region of the gap, and that in turn depends on the magnetic flux produced by the coil 104 and, of course, the current flowing through the coil 104. In other words, the stiffness of the bar D depends on the ease with which the fluid 82 is displaced from the chamber 80 of the coupling 20 and that in turn depends on the magnitude of the current in the coil 104 of the valve 22. The latter is easily controlled manually, such as with a rheostat, or by an automatic system which includes sensors that detect the speed of the vehicle, vertical acceleration to determine the condition of the surface over which the vehicle travels and lateral acceleration to determine the severity of the turns negotiated.

When the rotor 38 and piston 40 return to their initial position in which the rollers 42 are centered in the valleys 68 and 78, the cavity 80 enlarges under the pressure exerted on the fluid by the compressed gas in the accumulator chamber 108.

Variations are possible. For example, the restrictor 98 in the valve 22 may contain apertures in lieu of a gap around the periphery or in addition to such a gap. Moreover, the fluid 82 need not be entirely magneto-rheological. On the contrary, only the portion of the fluid in the valve 22 need have magento-rheological properties. In that event, the remaining portion of the fluid 82 could be separated from the rheological portion with a diaphragm or a piston. Actually, the fluid need not be rheological at all if the valve is constructed to vary and control the rate at which it escapes from the cavity 80. In lieu of pressurized gas acting on the diaphragm 106, the rheological fluid in the chamber 110 of the valve 80 may be maintained under pressure by a spring-loaded piston. The torsion rods 24 of the left and right sections 16 and 18 may be connected with a thin rod extended through the housing 36 and the rotor 38 and piston 40 in it so that the two sections 16 and 18 are united to provide basic stiffness.

What is claimed is:

1. A stabilizer bar for an automotive vehicle, said stabilizer bar comprising:
   first and second torsion rods which are aligned along an axis;
   a housing connected to the first torsion rod such that it will rotate with the first rod;
   a rotor located within the housing and connected to the second rod such that it will rotate with the second rod; the rotor having a face that is presented axially and is provided with ramps;
   a piston located within the housing such that it can shift axially with respect to the housing, but not rotationally, the piston together with the housing defining a cavity, the volume of which depends on the axial position of the piston in the housing, the piston having a face that is presented axially toward the face on the rotor and has ramps which are presented toward the ramps on the rotor, the ramps on the piston cooperating with the ramps on the rotor, as a consequence of relative rotation between the rotor and the piston and housing, to determine the axial position of the piston in the housing and the size of the cavity;
   a fluid in the cavity of the housing; and
   a valve for controlling the flow of fluid displaced from the cavity when the cavity decreases in volume.

2. A stabilizer bar according to claim 1 and further comprising rolling elements between the ramps on the rotor and the piston.

3. A stabilizer bar according to claim 1 wherein the fluid is at least in part rheological, and the rheological portion of the fluid is in the valve.

4. In combination with a structural component of an automotive vehicle and with left and right control arms that pivot on the structural component about axes that extend generally longitudinally of the vehicle, the stabilizer bar of claim 1 wherein the first torsion rod is connected to one of the control arms through a first torque arm and the second torsion rod is connected to the other control arm through a second torsion arm.

5. The combination according to claim 4 wherein the torsion rods are attached to the structural component with the housing and rotor being located between the locations where the torsion rods are attached to the structural components.

6. A stabilizer bar for an automotive vehicle, said bar comprising:
   first and second torsion rods which are aligned along an axis;
   a coupling including first, second, and third coupling members, the first coupling member being connected rigidly to the first torsion rod, the second coupling member being connected rigidly to the second torsion rod, the third coupling member being movable axially, but not rotationally, with respect to the first member and together with the first member enclosing a cavity, the volume of which depends on the axial position of the third member with respect to the second member, the second or third members having ramps which control the axial position of the third member relative to the second member and relative to the first member, with the axial position being dependent on the degree of relative rotation between the first and second members, whereby the volume of the cavity depends on the angular position of the first member relative to the second member;

a fluid in the cavity and being at least in part magneto-rheological; and a valve connected with the cavity for containing the rheological portion of the fluid and controlling the flow of fluid displaced from the cavity as relative rotation occurs between the first and second coupling members, the valve including an electrical coil for controlling the viscosity of the rheological fluid in it.

7. A stabilizer bar according to claim 6 wherein the valve contains a restriction and the coil controls the viscosity of the fluid at the restriction.

8. A stabilizer bar according to claim 6 wherein the ramps on the second and third coupling members are separated by rolling elements which bear against the ramps.

9. A stabilizer bar according to claim 6 wherein the second and third coupling members are located within the first coupling member.

10. A stabilizer bar for an automotive vehicle, said stabilizer bar comprising:

first and second torsion rods which are aligned along an axis;

a housing connected to the first torsion rod such that it will rotate with the first rod, the housing having a splined socket;

a rotor located within the housing and connected to the second rod such that it will rotate with the second rod; the rotor having ramps;

a piston located within the housing and having a splined stub shaft which projects into the splined socket of the housing, with the splines on the stub shaft being engaged with the splines in the socket of the housing so that the piston can shift axially with respect to the housing, but not rotationally, the piston together with the housing defining a cavity, the volume of which depends on the axial position of the piston in the housing, the piston having ramps which are presented toward the ramps on the rotor;

rolling elements between the ramps on the rotor and piston so that relative rotation between the rotor and the piston and housing, will change the axial position of the piston in the housing and the size of the cavity;

a fluid in the cavity of the housing; and a valve for controlling the flow of fluid displaced from the cavity when the cavity decreases in volume.

11. A stabilizer bar for an automotive vehicle, said stabilizer bar comprising:

first and second torsion rods which are aligned along an axis;

a housing connected to the first torsion rod such that it will rotate with the first rod;

a rotor located within the housing and connected to the second rod such that it will rotate with the second rod; the rotor having ramps;

a piston located within the housing such that it can shift axially with respect to the housing, but not rotationally, the piston together with the housing defining a cavity, the volume of which depends on the axial position of the piston in the housing, the piston having ramps which are presented toward the ramps on the rotor and cooperate with the ramps on the rotor, as a consequence of relative rotation between the rotor and the piston and housing, to determine the axial position of the piston in the housing and the size of the cavity;

a fluid in the cavity of the housing, the fluid being at least in part rheological; and a valve containing the rheological portion of the fluid, the valve controlling the flow of fluid displaced from the cavity when the cavity decreases in volume.

12. A stabilizer bar according to claim 11 wherein the ramps on the rotor and piston are arranged in pairs, with the ramps of each pair descending to a valley between those ramps.

13. A stabilizer bar according to claim 11 wherein the fluid is magneto-rheological at the valve, and the valve contains a restriction and a coil which produces a magnetic flux at the restriction, thus controlling the viscosity of the fluid at the restriction.

14. A stabilizer bar according to claim 13 wherein the valve includes a housing that contains a chamber and also includes a restrictor in the chamber to provide the restriction, the coil being located in the restrictor.

* * * * *